Sept. 7, 1954

R. R. BARBER ET AL 2,688,453

STRIP WINDING APPARATUS

Filed July 7, 1949

INVENTORS
R. R. BARBER
G. E. HENNING
B. A. RAETSCH
BY
ATTORNEY

INVENTORS
R. R. BARBER
G. E. HENNING
B. A. RAETSCH
BY
ATTORNEY

INVENTORS
R. R. BARBER
G. E. HENNING
B. A. RAETSCH
BY *[signature]*
ATTORNEY

Sept. 7, 1954   R. R. BARBER ET AL   2,688,453
STRIP WINDING APPARATUS

Filed July 7, 1949   6 Sheets-Sheet 4

INVENTORS
R. R. BARBER
G. E. HENNING
B. A. RAETSCH
BY
ATTORNEY

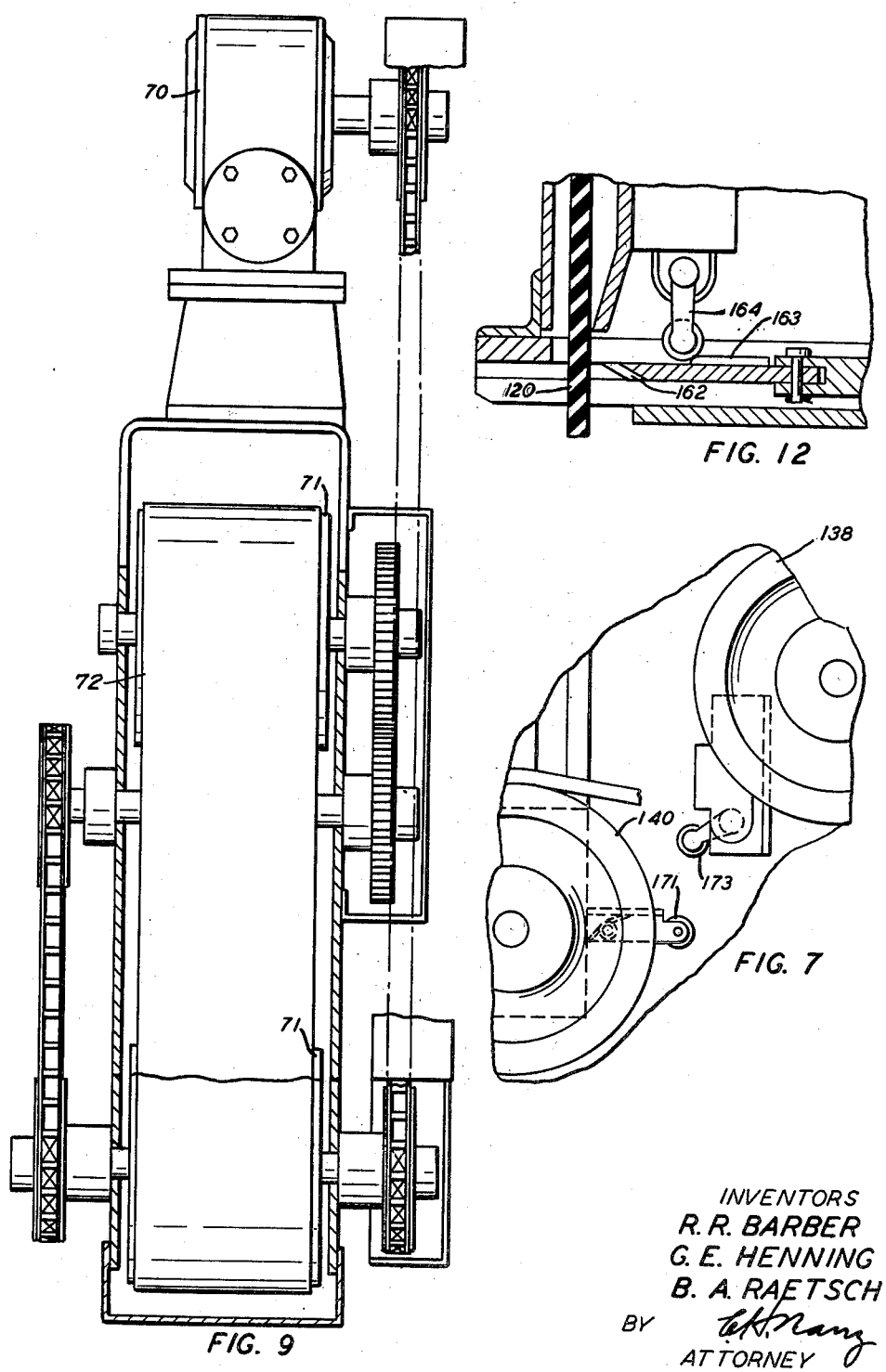

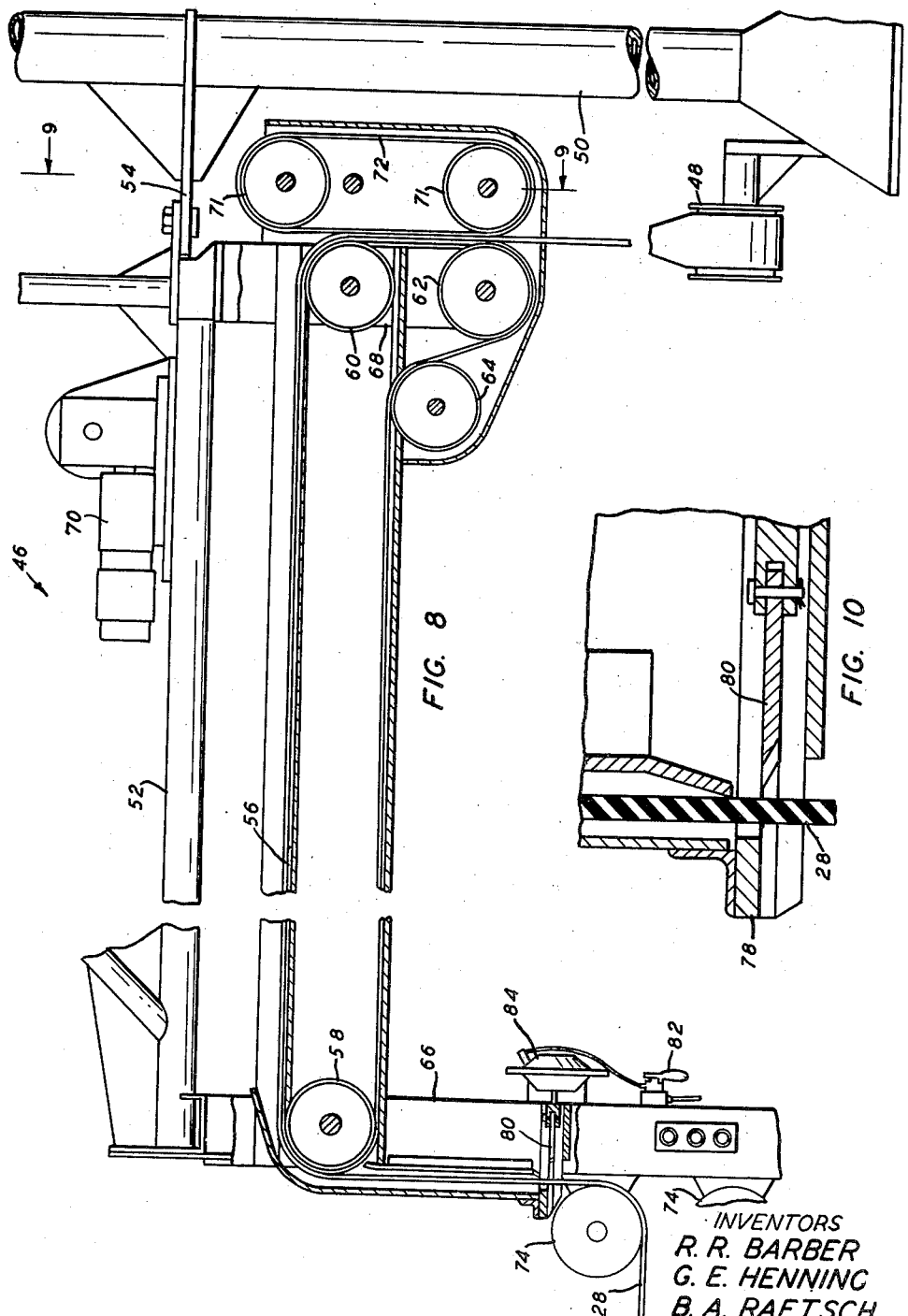

Patented Sept. 7, 1954

2,688,453

UNITED STATES PATENT OFFICE 2,688,453

STRIP WINDING APPARATUS

Robert R. Barber, Idlewild, George E. Henning, Baltimore, and Bruno A. Raetsch, Parkville, Md., assignors to Western Electric Company, Incorporated, New York, N. Y., a corporation of New York Application July 7, 1949, Serial No. 103,434

2 Claims. (Cl. 242—80)

1

This invention relates to systems for processing vulcanizable compounds, and more particularly to material handling apparatus useful in systems for formulating, working, conveying, storing and extruding vulcanizable insulating and jacketing compounds.

In the manufacture of filamentary articles, such as, for example, electrical conductors insulated and jacketed with vulcanizable compounds, the compounds usually are partially formulated and worked in Banbury mixers, and then are milled to further the mixing of the compounds and the breakdown of the vulcanizable constituents thereof. Just before the compounds are to be extruded, the compounds are milled again to work and heat them to extrudable condition, and at the same time a vulcanizing agent may be added. The compounds then are delivered to the extruders as needed.

In such a procedure, it has been very difficult to schedule the compounds so that they do not cool or vulcanize appreciably prior to extrusion thereof, and size control of extruded products has been difficult to maintain due to these factors. It has been proposed to completely formulate such compounds, cool them to temperatures at which they can be stored without prevulcanization thereof, storing the compounds until needed, and extruding the compounds starting from a cold condition. However, no efficient system for handling such compounds has been known heretofore.

An object of the invention is to provide new and improved systems for processing vulcanizable compounds.

A further object of the invention is to provide new and improved material handling apparatus useful in systems for formulating, working, conveying, storing and extruding vulcanizable insulating and jacketing compounds.

A system illustrating certain features of the invention includes apparatus for winding a continuous strip of a vulcanizable compound into a plurality of separate coils which can be stored until they are needed for extrustion. Said winding apparatus comprises a boom conveyer rotatable about a fixed pivot point to supply a plurality of stations spaced along an arc centered on said pivot point, and each of the stations is provided with means for winding the strip into coils. Cooperating with these units is means for continuously advancing the strip to the boom conveyer at a predetermined speed, means for periodically severing the strip, means for taking up any slack in the strip between the advancing

2 means and the boom conveyer, and means responsive to the severing means for actuating the boom conveyer and the slack tape up means.

A complete understanding of the invention may be obtained from the following description of a system forming a specific embodiment thereof, when read in conjunction with the appended drawings, in which:

Fig. 7 is an enlarged, fragmentary, elevation taken from line 7—7 of Fig. 6;

Fig. 8 is an enlarged fragmentary, vertical section taken along line 8—8 of Fig. 3;

Fig. 9 is a fragmentary, vertical section taken along line 9—9 of Fig. 8;

Fig. 10 is an enlarged, fragmentary, vertical section of a portion of the system;

Fig. 12 is an enlarged, fragmentary, elevation of a portion of the apparatus shown in Fig. 1.

Referring now in detail to the drawings, there is shown therein a system for mixing, working, forming into strips, cooling, storing and extruding insulating compounds around conductive cores, such as copper or bronze wires, and for mixing, working, extruding into strips, cooling, storing and extruding jacketing compounds around the covered conductive cores. The system includes a Banbury mixer 20 (Fig. 1), which mixes batches of all the ingredients of a vulcanizable Buna-S insulating compound, except either the sulphur or the accelerating agent therefore. Buna-S is a copolymer of butadiene and styrene. The successive batches are dropped from the mixer 20 to a strainer 22, are strained thereby, and the strained insulating compound is conveyed by a conveyer 24 to a mill 26.

Figure 1:
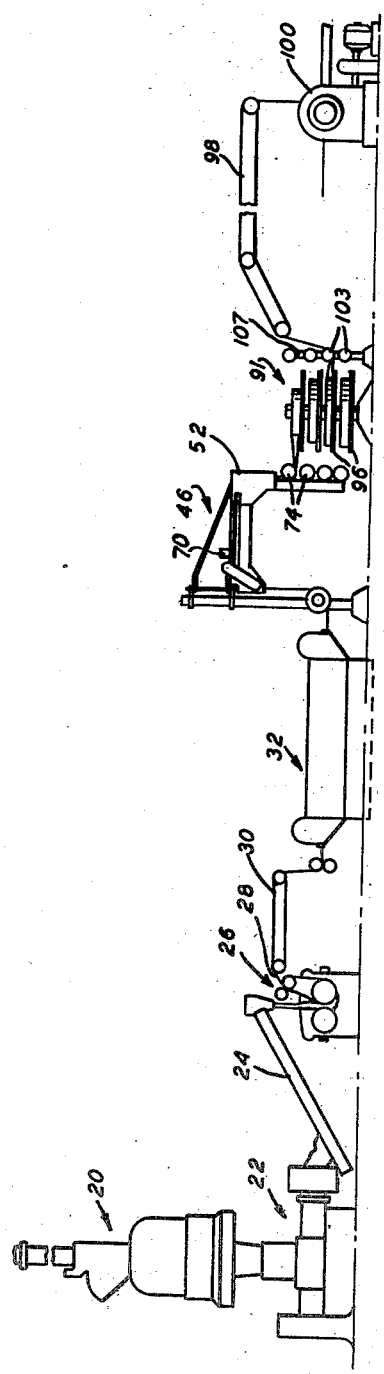
Fig. 1 is a schematic side elevation of a portion of a system embodying the invention.
Figure 4:
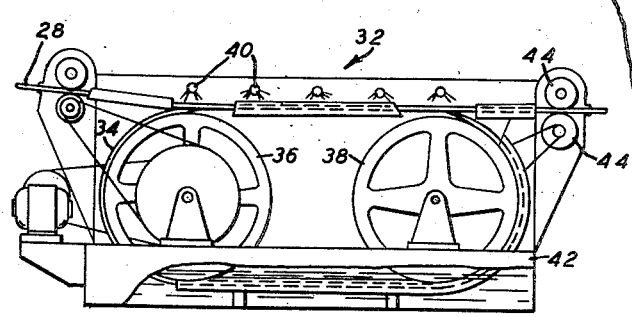
Fig. 4 is an enlarged side elevation of a portion of the apparatus with portions thereof broken away.

The mill 26 works the batches of the insulating compound, and the omitted vulcanizing agent (the sulphur or the accelerator) is added to the compound as it is milled. The worked compound is removed from the mill in the form of batch lengths of a strip 28, which is conveyed by a conveyer 30 to a cooler 32 (Figs. 1 and 4). The cooler includes an endless cable 34 mounted on grooved drums 36 and 38. The cable advances the strip through the cooler, and tends to overrun the conveyer 30 slightly to keep slack out of the strip. Pipes 40—40 spray cold water on the upper portions of the strip, and the lower portions of the strip are immersed in cold water in the bottom of a tank 42.

Feed rolls 44—44 advance the strip from the cooler toward a boom conveyer 46. The boom conveyer 46 includes a guide sheave 48 (Fig. 8) supported by post 50, which supports a boom 52 pivotally from an arm 54. A conveyer belt 56 is supported by sheaves 58, 60, 62 and 64 mounted on arms 66 and 68. A motor 70 serves to drive sheaves 71—71 to drive a belt 72 to advance the strip 28 from the sheave 48 to one of vertically spaced guide sheaves 74—74. The belt 72 holds the strip against the conveyer belt 56 to provide traction therebetween to advance the strip. The boom conveyer tends to advance the strip 28 slightly faster than in the cooler 32 to keep slack out of the portion of the strip therebetween.

As the strip 28 is advanced to one of the sheaves 74—74, it passes between a bar 78 (Figs. 8 and 10) and a spring-retracted shear blade 80. When a handle 82 is turned by an operator, a pneumatic drive 84 forces the blade 80 to the left, as viewed in Fig. 10, to sever the strip into a batch length after which the lever 82 may be actuated to cause the blade 80 to be retracted.

The boom 52 may be swung manually to deliver the strip to any of a plurality of storage devices 91, 92, 93 and 94 (Fig. 3) mounted along an arc centered on the post 50. The storage devices 91, 92, 93 and 94 are identical, and certain features thereof are disclosed fully and claimed in copending applications Serial No. 103,433, filed July 7, 1949, now Patent No. 2,622,820, by R. R. Barber, P. R. Powell and B. A. Raetsch for "Apparatus for Handling Strip Material," and Serial No. 103,435, filed July 7, 1949, now Patent No. 2,622,821, by P. R. Powell for "Clutches."

The storage device 91 includes vertically spaced reels 96—96 (Fig. 1) driven frictionally and selectively by an arbor. Each of the reels 96—96 is at a level designed to receive the strip 28 from one of the sheaves 74—74, and is designed to receive a length of strip equaling an entire batch of the compound from the Banbury mixer 20.

A conveyer 98 serves to advance seriatim the batch lengths of the strip 28 from the reels 96—96 to a continuous extruding and vulcanizing machine 100, and the strip is fed automatically into the machine 100 as needed thereby. The machine 100 may be one of the type disclosed and claimed in copending application Serial No. 86,062, filed April 7, 1949, by A. N. Gray for "Methods of and Apparatus for Simultaneously Advancing and Plasticizing Plastic Compounds," now Patent 2,547,000, granted April 3, 1951. Belt conveyers 101—101 convey the lengths of the strip on storage devices 92, 93 and 94 from those devices to continuous extrusion and vulcanization machines 102—102.

One of guide sheaves 103—103 mounted on a standard 107, guides a length of the strip from one of the reels 96—96 to the conveyer 98, and, since the reels 96—96 may be driven selectively, a length on one reel may be unwound from one of the reels simultaneously with the winding of another length on another of the reels. The machines 100 and 102—102 work the cold compound to bring it to extrudable condition, extrude the compound into insulating coverings 104—104 over conductive cores 105—105 to form insulated cores 106—106, vulcanize the coverings, and reel the insulated cores 106—106 on reels 108—108.

Figure 2:
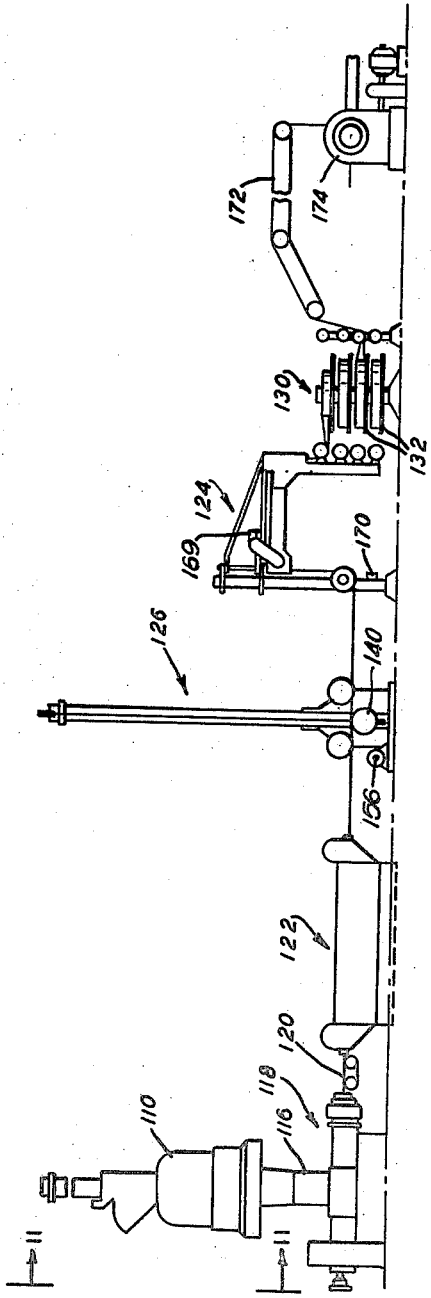
Fig. 2 is a schematic side elevation of another portion of the system.
Figure 11:
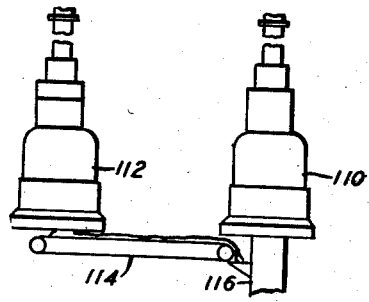
Fig. 11 is an end elevation of the apparatus taken from line 11—11 of Fig. 2.

In preparing jacketing compound, all the ingredients of the compound are introduced in alternately timed batches into Banbury mixers 110 and 112 (Figs. 2 and 11). The Banbury mixer 112 is connected by a conveyer 114 to a hopper 116 of a strip extruder 118, and the Banbury mixer 110 is connected directly to the hopper 116. Each of these mixers works and mixes together all the ingredients of the jacketing compound, which in the present instance is a vulcanizable compound including "neoprene" (polymerized chloroprene) as its vulcanizable constituent, a vulcanizing agent (zinc oxide), fillers, plasticizers and the like. The mixing cycles of the mixers 110 and 112 are staggered so that they discharge mixed batches alternately. Thus, the strip extruder 118 may be run continuously.

The extruder 118 extrudes the neoprene jacketing compound as a strip 120, which is advanced immediately into a cooler 122, which is identical with the cooler 32. The cooler 122 tends to advance the strip slightly faster than it is extruded so that slack is kept out of the strip. The strip 120 is advanced from the cooler 122 by a boom conveyer 124 which is substantially identical with the boom conveyer 46, through a slack-takeup device 126 to one of a plurality of storage devices 130—130 (Fig. 3), which are identical in construction and operation with the storage devices 91, 92, 93 and 94. The boom conveyer 124 delivers the strip selectively to any of reels 132—132 forming parts of the storage devices 130—130.

The slack takeup device 126 (Figs. 2, 5 and 6) includes guide sheaves 136 and 138 mounted on fixed axes of rotation, and a guide sheave 140 mounted on a carriage 142 movable along an elongated guideway 144. Both ends of a chain 146 are secured to the carriage 142, and the chain meshes with guide sprockets 148, 150 and 152 and a drive sprocket 154 drivable selectively in either a counterclockwise direction or in a clockwise direction, as viewed in Fig. 5, by an electric motor 156 (Fig. 6) and a gear reducer 158. A controller 160 of a conventional type synchronizes the drive of the slack takeup device 126, the drive of the cooler 122 and the drive of the strip extruder 118.

Figure 5:
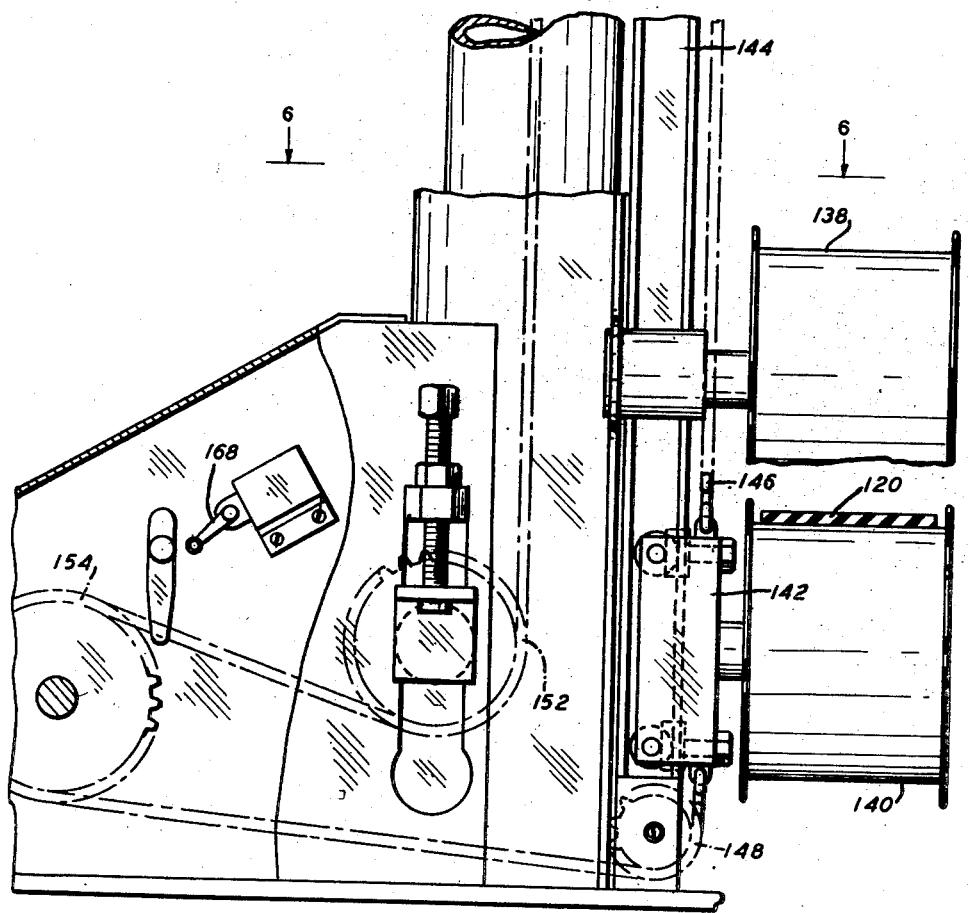
Fig. 5 is an enlarged side elevation of another portion of the system.

When a blade 162 (Fig. 12) is actuated to cut the strip 120, whereby a cam 163 actuates a limit switch 164, preparatory to stopping the winding of the strip on one of the reels 132—132 of one of the storage devices 130—130 (Fig. 2), the actuation of the limit switch 164 causes energization of the motor 156 (Fig. 6) to drive the drive sprocket 154 in a counterclockwise direction, as viewed in Fig. 5. This tends to raise the sheave 140 to form a storage loop of the strip 120 with the sheaves 136 and 138. This drive of the sheave 140 tends to accumulate the strip at a slightly greater rate of speed than that at which the strip is discharged from the cooler 122 to take up slack in the portion of the strip therebetween. If the carriage 142 reaches the top of the guideway 144, a trip arm 166 (Fig. 5) mounted on the chain actuates a limit switch 168 (Fig. 5) to reverse the motor 156 (Fig. 6) and start a drive motor 169 (Fig. 2) of the boom conveyor 124, which tends to overrun the slack takeup device 126 slightly to take up slack therebetween.

A manually operative starting switch 170 (Fig.

2) serves to start the boom conveyor 124 and to actuate the motor 156 to lower the sheave 140 to give up the stored portion of the strip 120. Thus, a new reel may be started, and that reel and the boom conveyor 124 tend to overrun to the extent necessary to take up the slack given up by the slack takeup device 126. An escapement type tripper 171 (Fig. 7) carried with the sheave 140 actuates a limit switch 173 when the sheave 140 returns to its lowermost position to stop the motor 156.

The batch lengths of the strip 120 stored by the storage devices 130—130 are carried by belt conveyors 172—172 (Fig. 3) to continuous extruding and vulcanizing machines 174—174, which work the jacketing compound to a highly extrudable condition and extrude it into jackets around insulated cores such as are illustrated by the insulated core 106. The belt conveyors are controlled automatically by the rate of speed at which the machines 174—174 take in the strip, and also may be run at a much higher rate when such speed is needed to fill the conveyors with the strip.

Certain features of the machines 174—174 are disclosed and claimed in copending applications Serial No. 86,085, filed April 7, 1949, now abandoned, by G. E. Gliss for "Methods of and Apparatus for Advancing and Working Plastic Compounds" and Serial No. 86,086, filed April 7, 1949, now abandoned, by G. E. Gliss and A. N. Gray for "Methods of and Apparatus for Working and Extruding Plastic Compounds into Article-Form."

*Operation*

All the ingredients of the highly accelerated insulating compound, except the vulcanizing or accelerating agent thereof, are placed in the mixer 20 (Fig. 1), and the mixer 20 is operated to mix the ingredients together. After the mixer 20 has completed its working and mixing of the ingredients, the batch of compound is dropped into the strainer 22, which strains the compound and discharges its onto the belt conveyor 24. The belt conveyor 24 carries the compound to the mill 26, and the mill 26 works the compound. The vulcanizing or accelerating agent, which had been omitted, is added to the compound on the mill and thoroughly mixed therewith by the mill.

After the batch of compound has been worked on the mill 26, the conveyor 30 is started and the compound is taken continuously from the mill in the form of a length of the strip 28. The leading end of the portion of the length of the strip coming off the mill is spliced to the trailing end of a length of the strip in the cooler 32, and the cooler 32, the boom conveyor 46 and the one of the storage devices 91, 92, 93 and 94 (Fig. 3), which is to wind up the strip, are started. After the batch of compound is completely stripped from the mill and the trailing end of the length of strip formed thereby is still on the conveyor 30 (Fig. 1), the conveyors 30 and 46 and the drive of the cooler 32 are stopped. The knife 80 (Fig. 8) then is actuated to sever the strip, and the drive of the cooler 32, the conveyors 30 and 46 are restarted, and are run until all but a splicable portion of the length of strip just taken from the mill has been drawn into the cooler 32. The newy formed leading end of the strip then is secured to an empty storage reel, and the conveyors 30 and 46 and the drive of the cooler 32 are kept idle until the next length strip is being withdrawn from the mill 26.

The lengths of the strip 28 of insulating compound on the storage devices 91, 92, 93 and 94 are fed as needed by the conveyors 101—101 to the machines 100 and 102—102. The machines 100 and 102—102 form and vulcanize the coverings 104—104, and the insulated cores 106—106 are taken up on the reels 108—108, which are stored adjacent to the machines 174—174 until needed by those machines. The machines 100 and 102—102 are run substantially twice as fast as the machines 174—174, and there are two of the machines 174—174 provided for and adjacent to each of the machines 100 and 102—102, each of the machines 100 and 102—102 supplying cores for the adjacent two of the machines 174—174.

All the ingredients of the packeting compound are introduced in batch quantities alternately and at equally spaced intervals into the mixers 110 and 112 (Figs. 1 and 11). These mixers mix the batches alternately, and the batches are emptied alternately into the hopper 116 and upon the conveyor 114, respectively. As a batch from the mixer 110 is used up by the extruder 118, the mixer 112 discharges its batch upon the conveyor 114, and the conveyor 114 discharges this batch into the hopper 116. Hence, the extruder is supplied with sufficient compound from the mixers 110 and 112 to run continuously. The extruder 118 extrudes the jacketing compound continuously into the strip 120, which is advanced continuously through the cooler 122 wherein the strip is cooled to substantially room temperature to permit storage of the strip at that temperature without vulcanization thereof.

Figure 3:
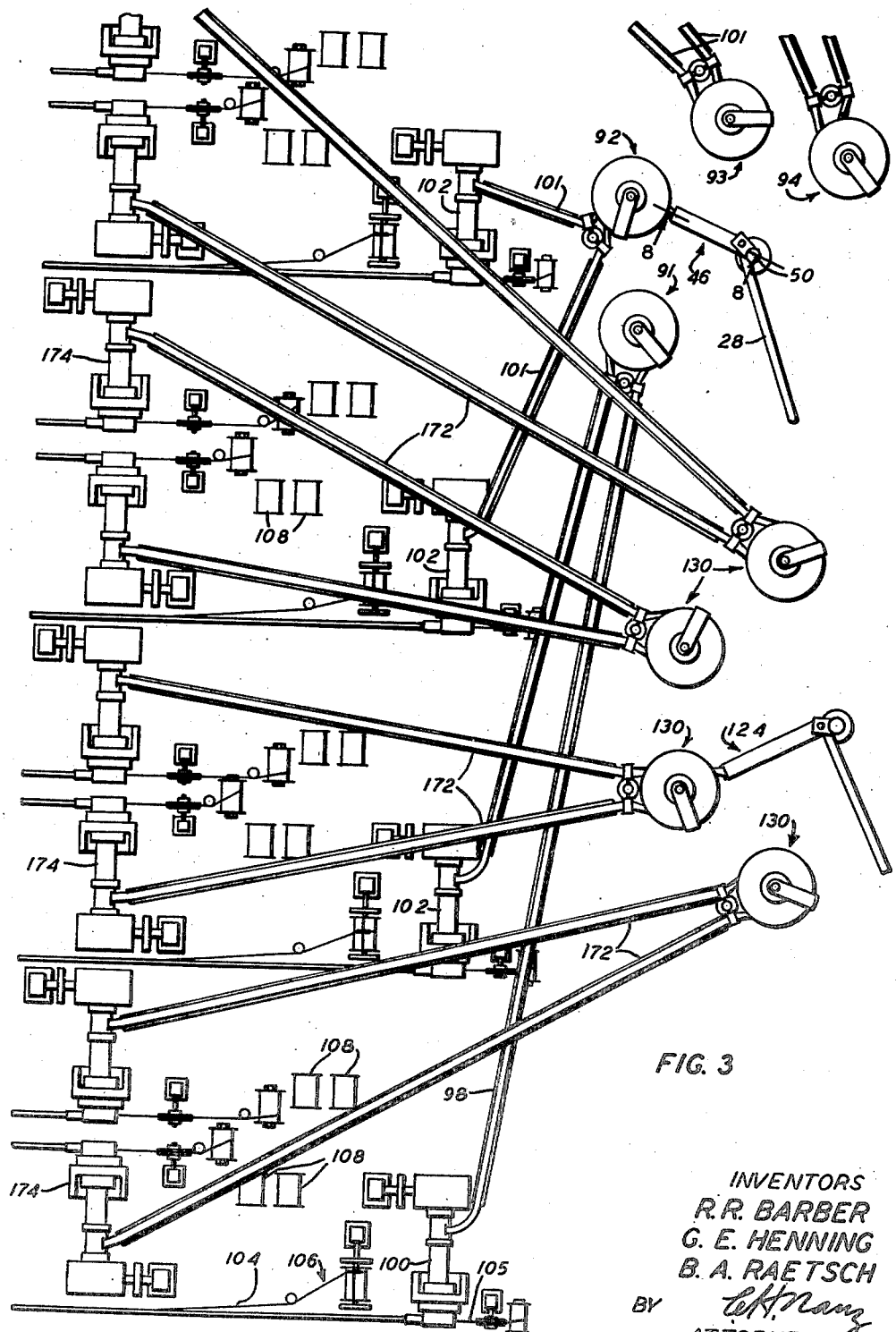
Fig. 3 is a top plan view of a portion of the system.
Figure 6:
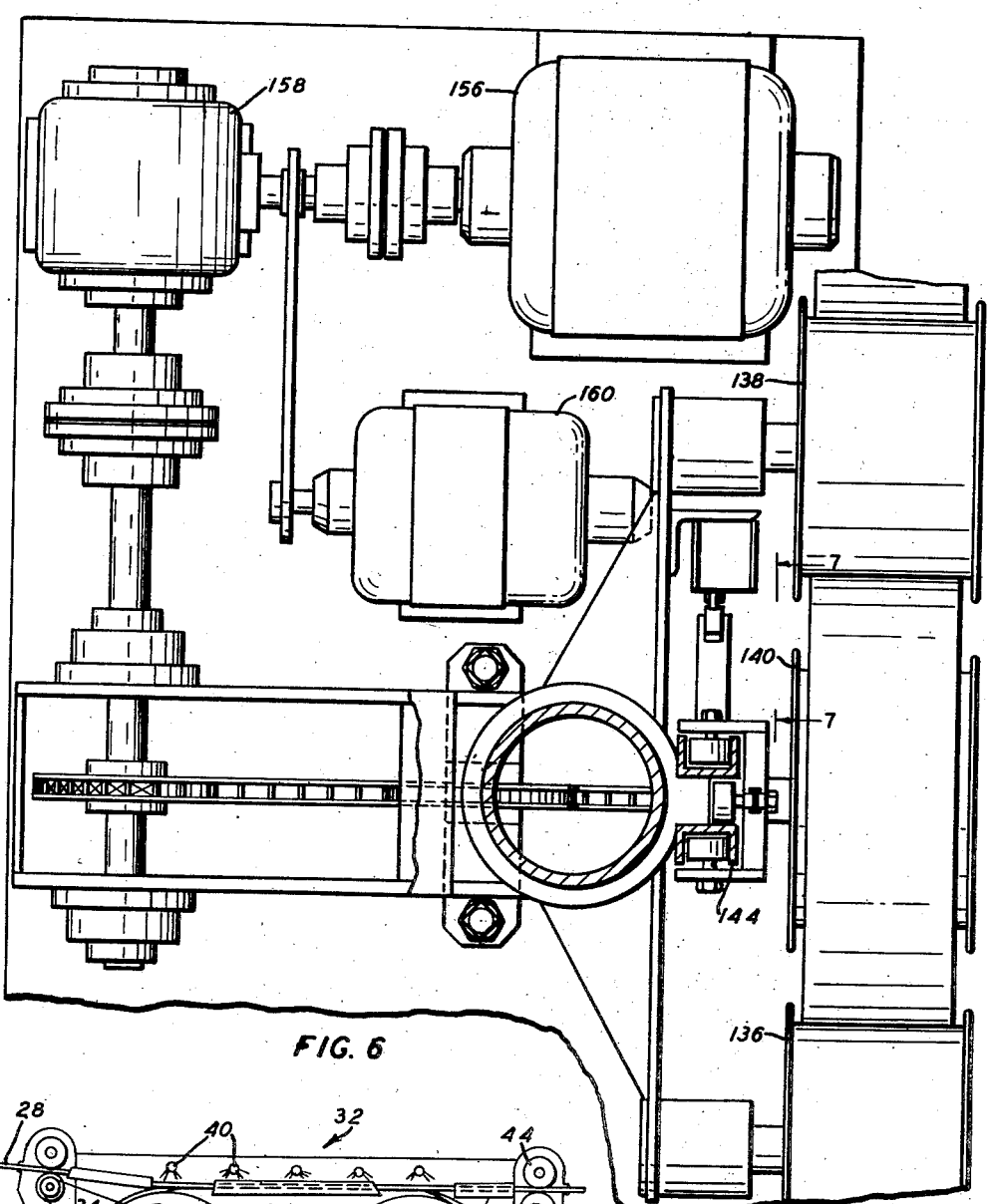
Fig. 6 is a fragmentary, horizontal section taken along line 6—6 of Fig. 5.

The boom conveyer 124 advances the strip 120 from the cooler 122 through the slack takeup device 126 to one of the reels 132—132 on the storage devices 130—130 (Fig. 3). That storage device is driven to drive the reel frictionally to wind the strip into a batch length pad thereon. When that reel is nearly filled, the blade 162 (Fig. 12) is actuated to sever the strip 120 causing the cam 163 to actuate the limit switch 164, which energizes a holding circuit to the motor 156 to drive it in a direction such as to raise the sheave 140. The strip then is taken up by the sheaves 140, 136 and 138 at the same rate as that at which the strip is discharged from the cooler 122. The operator then swings the boom conveyer to one of the storage devices 130—130, if necessary, and restarts the boom conveyer. Restarting the boom conveyer actuates a circuit to reverse the drive of the motor 156 (Fig. 6) to lower the sheave 140 slowly at a rate of speed at which no slack is provided between the slack takeup device and the boom conveyer and at which all the slack taken up by the slack takeup device is given up before the operative reel of the storage device is filled. When the sheave 140 arrives at its lowermost position the tripper 171 (Fig. 7) strikes the limit switch 173 to stop the motor 156 (Fig. 6). The strip is fed continuously to the empty reel until that reel is full, and the operations just described are repeated.

The lengths of the strip 120 on the storage devices 130—130 are advanced by the belt conveyors 172—172 to the machines 174—174, which extrude and vulcanize jackets over the insulated cores 106—106 to form jacketed conductors. These conductors are coiled, cut and tied for shipment. The takeups of the machines 100 and 102—102 are within a few feet of the supply stations of the machines 174—174, and storage space is provided therebetween so that little time and effort are required to move the reels from the machines 100 and 102—102 to the storage space and to move them from the storage space to the machines 174—174. Since the storage space is provided, a reserve of reels 108—108 of the insulated cores 106—106 may be kept so that the operations of the machines 174—174 need not be interrupted due to any lack of the cores 106—106.

The above-described system provides a smooth flow of compounds to the storage devices 91, 92, 93, 94 and 130—130, which maintain a reserve of the compounds immediately available to the machines 100 and 102—102 and 174—174. Hence, the operations of the Banbury mixers 20, 110 and 112, the mill 30, the coolers 32 and 122 and the boom conveyers 46 and 124 need not be tied in closely from the standpoint of time with the operations of the machines 100, 102—102 and 174—174.

What is claimed is:

1. A system for winding a continuous strip into a plurality of separate coils, which comprises a boom conveyor rotatable about a fixed pivot point for selectively conveying a continuous strip to supply a plurality of stations spaced along an arc centered on said pivot point, means located at the stations selectively supplied by the boom conveyor for winding the strip into a plurality of separate coils having predetermined lengths, means for continuously advancing the strip to the boom conveyor at a predetermined speed, means for periodically severing the strip to successively separate the coils from each other as they are formed, means located between the advancing means and the boom conveyor for taking up any slack formed therein while the strip is being wound into coils, and means responsive to the severing means for actuating the boom conveyor and the slack take up means to periodically supply strip to the winding means in accordance with the speed of the strip-advancing means.

2. A system for winding a continuous strip into a plurality of separate coils, which comprises a boom conveyor rotatable about a fixed pivot point for conveying a continuous strip to supply selectively a plurality of stations spaced along an arc centered on said pivot point, means located at each of the stations supplied selectively by the boom conveyor for winding the strip into a plurality of separate coils having predetermined lengths, means for continuously advancing the strip to the boom conveyor at a predetermined speed, a movable sheave located between the advancing means and the boom conveyor for forming a loop in the strip to take up any slack formed therein, means for moving the sheave towards an upper limit forming a loop of maximum size in the strip and towards a lower limit decreasing the size of the loop, means mounted at the outer end of the boom conveyor for severing the strip each time a coil having a predetermined length has been formed at one of the winding stations, means responsive to the severing means for simultaneously stopping the boom conveyor and actuating the sheave-moving means to move the sheave towards its upper limit while the strip is being shifted from one winding station to another, means responsive to the sheave at its upper limit for simultaneously actuating the boom conveyor and reversing the sheave-moving means to decrease the size of the loop, and means responsive to the sheave at its lower limit for stopping the sheave-moving means.

References Cited in the file of this patent

UNITED STATES PATENTS

| Number | Name | Date |
| --- | --- | --- |
| 187,271 | Haight | Feb. 13, 1877 |
| 1,382,207 | McGuire | June 21, 1921 |
| 1,469,875 | Beauregard | Oct. 9, 1923 |
| 1,513,733 | Banbury | Nov. 4, 1924 |
| 1,628,836 | Gammeter | May 17, 1927 |
| 1,680,171 | Hollenbeck | Aug. 7, 1928 |
| 1,687,928 | Castricum et al. | Oct. 16, 1928 |
| 1,792,316 | Leguillon | Feb. 10, 1931 |
| 1,897,961 | Snyder | Feb. 14, 1933 |
| 1,930,736 | Burrell | Oct. 17, 1933 |
| 1,942,398 | Fowler | Jan. 9, 1934 |
| 1,963,503 | Quinton | June 19, 1934 |
| 2,062,008 | Lewis et al. | Nov. 24, 1936 |
| 2,167,734 | Zonino | Aug. 1, 1939 |
| 2,200,656 | Schefe | May 14, 1940 |
| 2,264,237 | Brown | Nov. 25, 1941 |

FOREIGN PATENTS

| Number | Country | Date |
| --- | --- | --- |
| 374,470 | Great Britain | June 6, 1932 |